Aug. 4, 1931.  A. S. GRAY ET AL  1,816,966
LONG POLE POWER PRUNING SAW
Filed May 19, 1930   2 Sheets-Sheet 2
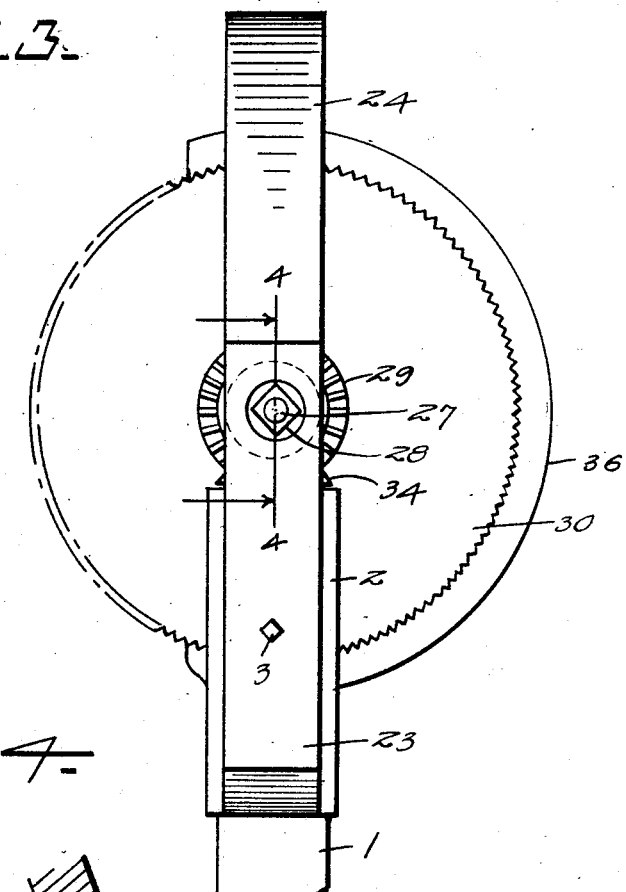
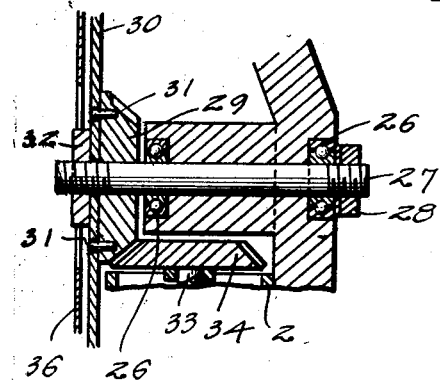
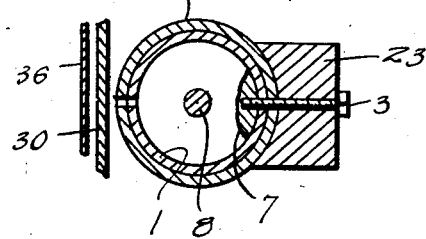
Inventor
A. S. Gray
U. A. Simmons
By Watson E. Coleman Patented Aug. 4, 1931

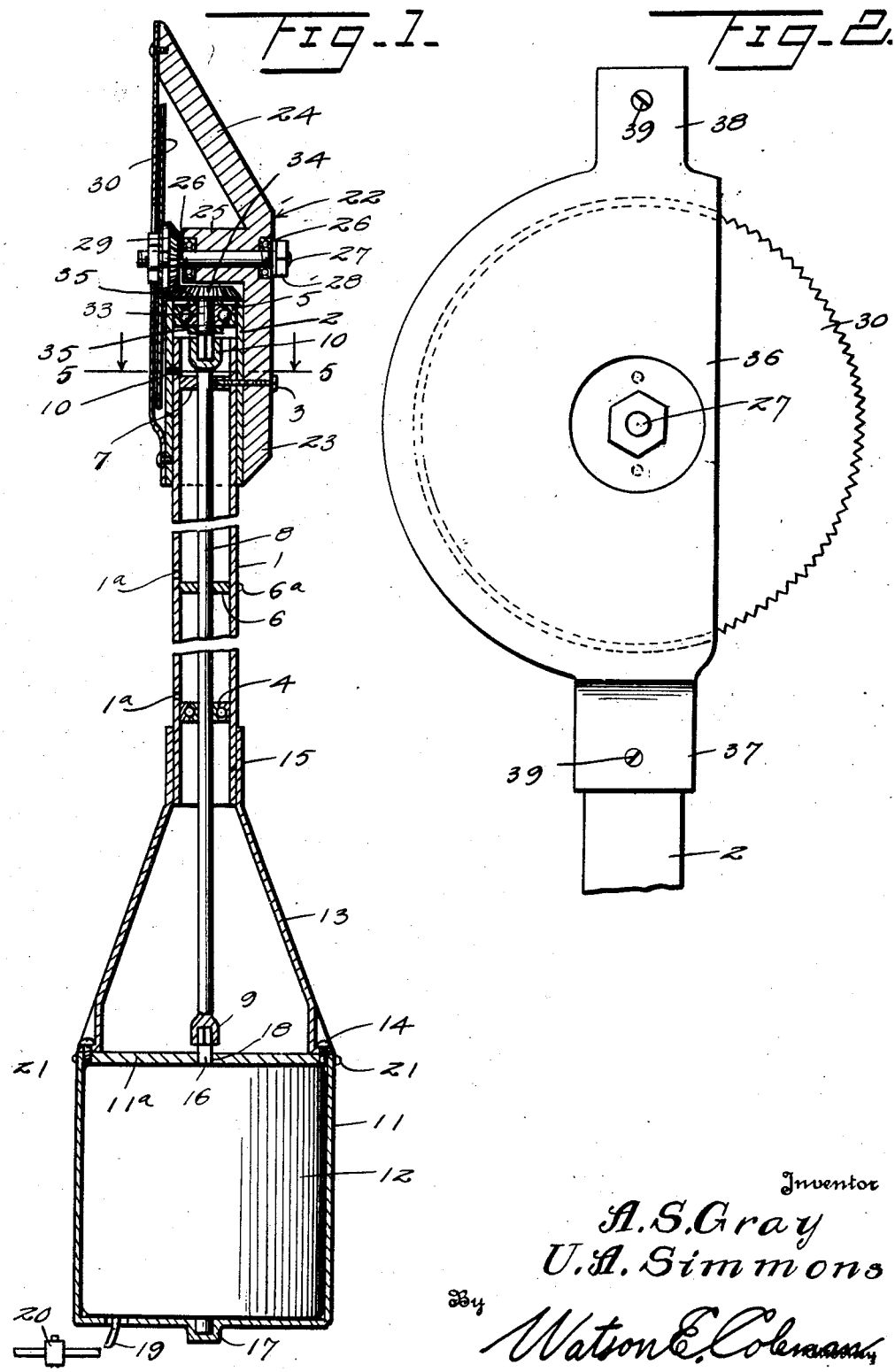

1,816,966

UNITED STATES PATENT OFFICE

ALBERT S. GRAY AND ULYS A. SIMMONS, OF WENATCHEE, WASHINGTON

LONG POLE POWER PRUNING SAW

Application filed May 19, 1930. Serial No. 453,655.

This invention relates to pruning saws, and has for one of its objects to provide a novel, simple and durable device of this character which shall be adapted to permit the quick and efficient pruning of a tree from the ground and with comparatively little effort on the part of the operator.

To attain the foregoing and other objects, the nature of which will appear as the description proceeds, the invention comprehends the provision of a device of the character stated which shall embody a hollow pole, a circular saw, means rotatably supporting the saw from the upper end of the pole, an electrical motor, means supporting the motor from the lower end of the pole with its armature shaft in alinement with the longitudinal axis of the pole, a shaft extending longitudinally of and rotatably supported within the pole and connected at its lower end to the armature shaft of the motor, and means establishing a driving connection between the upper end of the shaft and the blade.

The invention further comprehends the provision of a device of the character stated which shall embody a shield constituting a guard for the upper part of the saw.

The invention is hereinafter fully described and claimed, and illustrated in the accompanying drawings, wherein:—

Figure 1 is a sectional view taken on a plane extending longitudinally and centrally through a pruning saw embodying our invention;

Figure 2 is a view in side elevation of the upper portion of the pruning saw;

Figure 3 is a similar view with the parts viewed from the opposite side of the pruning saw;

Figure 4 is a sectional view taken on the plane indicated by the line 4—4 of Figure 3, and Figure 5 is a sectional view taken on a plane indicated by the line 5—5 of Figure 1.

The pruning saw comprises a pole 1 which is hollow and preferably made of brass and may be of any desired or required length. A brass sleeve 2 surrounds the upper end portion of the pole 1 and extends above the upper end of the pole, the sleeve being secured to the pole by a machine screw 3. An anti-friction bearing 4 is secured within the lower end of the pole 1, and a similar bearing 5 is secured within the upper end of the sleeve 2. A lower guide 6 and an upper giude 7 are secured within the pole 1 above the bearing 4. The guide 6 is secured in place by a machine screw $6^a$, and the guide 7 is secured in place by the screw 3. A steel shaft 8 is arranged centrally within the pole 1 and it extends from the upper end of the pole to a point below the lower end thereof. The shaft 8 is provided at its lower end with an angular socket 9 and at its upper end with a similar socket 10. The pole 1 is provided with openings $1^a$ to permit the bearings 4 and 5 and the guides 6 and 7 to be lubricated.

A cylindrical metal casing 11, which constitutes a housing for an electric motor 12, is secured to the lower end of the pole 1 by a hollow metal coupling 13 of conical formation. The coupling 13 is secured at its lower end to the upper end of the casing 11 by machine screws 14, and it is provided at its upper end with a cylindrical extension 15 which receives the lower end of the pole 1 and may be welded to the pole or secured thereto in any other suitable manner. The motor 12 is small and of a fractional horsepower, and it is arranged within the casing 11 with its armature shaft 16 arranged in alinement with the shaft 8. The casing 11 is provided with a bearing 17 for the lower end of the armature shaft 16 and with a bearing 18 for the upper end of said shaft. The upper end of the armature shaft 16 extends above the bearings 18, and it is of angular formation in cross section and arranged within the coupling 9 to establish a driving connection between the armature shaft and the shaft 8. The motor 12 is provided with current by conductors arranged within a flexible metallic sheath 19. The conductors may be provided at their outer ends with a plug or any other suitable device for connecting them to a source of current, and a switch 20 may be arranged therein close to the casing 11, the switch being suitably secured to and supported by the sheath 19. The top wall $11^a$ of the casing 11 is removably secured in place by machine screws 21 to permit the application and removal of the motor 12 to the casing.

A casting 22, which comprises a lower arm 23 and an upper arm 24, is secured to the sleeve 2 through the medium of the lower arm. The arm 23 is arranged at one side of the sleeve 2 and extends longitudinally thereof; it is provided with a concave inner side for the reception of that portion of the sleeve with which it contacts, and it is secured to the sleeve by the screw 3. The arms 23 and 24 are angularly related and the arm 24 extends inwardly and upwardly from the upper end of the arm 23. The casting 22 is provided at the juncture of its arms 23 and 24 with an inwardly extending bearing boss 25 which overlies and is spaced from the upper end of the sleeve 2. The boss 25 is provided with anti-friction bearings 26, and extending through the boss and journaled in the bearings is an arbor 27. The arbor 27 is screw threadedly engaged with the inner races of the bearings 26 and it is secured against accidental movement with respect to the inner races by a lock nut 28.

A beveled gear 29 is screw threadedly engaged with the arbor 27 at the inner end of the boss 25, and mounted upon the arbor outwardly of the gear is a circular saw 30. Pins 31 carried by the gear 29 and passing through openings in the saw 30, serve to hold the saw against rotation with respect to the arbor 27, the saw being held against outward displacement from the pins by a nut 32 which also serves to lock the gear 29 on the arbor. A stub shaft 33 carried by the bearing 5, is provided at its upper end with a beveled gear 34 which meshes with the gear 29, and has an angular lower end portion which fits in the socket 10 to establish a driving connection between it and the shaft 8. The shaft 32 passes through the inner race of the bearing 5, and is secured thereto by nuts 35.

A guard or shield 36 is provided for the saw 30. The guard or shield 36, which is of segmental formation, is arranged at the outer side of the saw 30 and extends radially beyond that portion of the edge of the saw located at one side of the pole 1. The guard 36 is provided at its upper and lower edges with lugs 37 and 38. The lug 37 contacts with the sleeve 2 and the lug 38 with the upper end of the arm 24, and they are secured to these parts by machine screws 39.

It should be apparent from the foregoing description, taken in connection with the accompanying drawings, that the saw 30 will be driven at a rapid rate by the motor 12, and that the operation of the motor is under the control of the switch 20 which is conveniently located to the casing 11, which, together with the coupling 13, provides means by which the device may be conveniently handled. It will be further understood that the device is strong and durable, and that it may be manufactured and sold at a low cost.

While we have described the principle of the invention, together with the device which we now consider the preferred embodiment thereof, it is to be understood that the structure shown is merely illustrative and that such changes may be made, when desired, as fall within the scope of the invention as claimed.

We claim:—

A pruning device comprising a hollow pole, a shaft extending longitudinally of and rotatably supported within the pole, an electric motor secured to the lower end of the pole with its armature shaft secured to said first shaft, a sleeve on the upper end of the pole and extending above the same, an arm extending longitudinally of one side of the sleeve and provided at its upper end with a bearing boss extending across the upper end of the sleeve, means removably securing the sleeve and arm to the pole, an arbor journaled in the bearing boss, a circular saw secured to the arbor, a stub shaft journaled in the sleeve and detachably connected to said first shaft, meshing gears fixed to the arbor and stub shaft, an arm extending upwardly from the upper end of said first arm in the direction of the opposite side of the sleeve and to a point beyond the saw, and a shield for the saw removably secured to the upper end of said second arm and to the sleeve.

In testimony whereof we hereunto affix our signatures.

ALBERT S. GRAY.
ULYS A. SIMMONS.